(12) United States Patent
Yuen

(10) Patent No.: US 7,458,481 B2
(45) Date of Patent: Dec. 2, 2008

(54) DRINK-ITEM HOLDING APPARATUS AND A PORTABLE COOLER BOX INCORPORATING THE SAME

(75) Inventor: John Se-Kit Yuen, Kowloon (HK)

(73) Assignee: John Manufacturing Limited, Kowloon (HK)

( * ) Notice: Subject to any disclaimer, the term of this patent is extended or adjusted under 35 U.S.C. 154(b) by 683 days.

(21) Appl. No.: 10/973,292

(22) Filed: Oct. 27, 2004

(65) Prior Publication Data

US 2005/0139741 A1 Jun. 30, 2005

(30) Foreign Application Priority Data

Oct. 29, 2003 (GB) .................................. 0325280.6

(51) Int. Cl.
*B65D 25/00* (2006.01)

(52) U.S. Cl. .................... 220/737; 220/915.2; 62/457.7

(58) Field of Classification Search ................ 220/737, 220/741, 742, 915.1, 915.2; 248/311.2; 62/457.7
See application file for complete search history.

(56) References Cited

U.S. PATENT DOCUMENTS

| | | | |
|---|---|---|---|
| 4,434,961 A | * | 3/1984 | Hoye ........................ 248/331.2 |
| 5,318,266 A | | 6/1994 | Liu |
| 5,423,508 A | | 6/1995 | Isenga et al. |
| 5,601,268 A | | 2/1997 | Dunchock |
| 5,603,477 A | | 2/1997 | Deutsch |
| 6,052,939 A | * | 4/2000 | McClain et al. .............. 43/54.1 |
| 6,095,471 A | * | 8/2000 | Huang ..................... 248/311.2 |
| D480,275 S | * | 10/2003 | Yuen ........................... D7/605 |

\* cited by examiner

*Primary Examiner*—Anthony D Stashick
*Assistant Examiner*—Harry A Grosso
(74) *Attorney, Agent, or Firm*—Mattingly, Stanger, Malur & Brundidge, PC

(57) ABSTRACT

A drink-item holding apparatus incorporates an upper flap and a lower flap which may be unfolded from a stowed configuration to a deployed configuration in which the upper flap is releasably latched in its horizontal position. Projections at the rear edge of the upper flap resiliently push in L-shaped arms against the biasing action of springs until the projections snap past the arms which then serve to latch the upper flap in its deployed configuration. The upper flap may be rotated in the reverse direction in order to unlatch the projections so as to return to the stowed configuration. The upper flap is therefore protected against inadvertent downward rotation. The lower flap folds away upwards, and the upper flap folds away downwards against the lower surface of the lower flap in order to produce a compact arrangement of the apparatus.

9 Claims, 5 Drawing Sheets

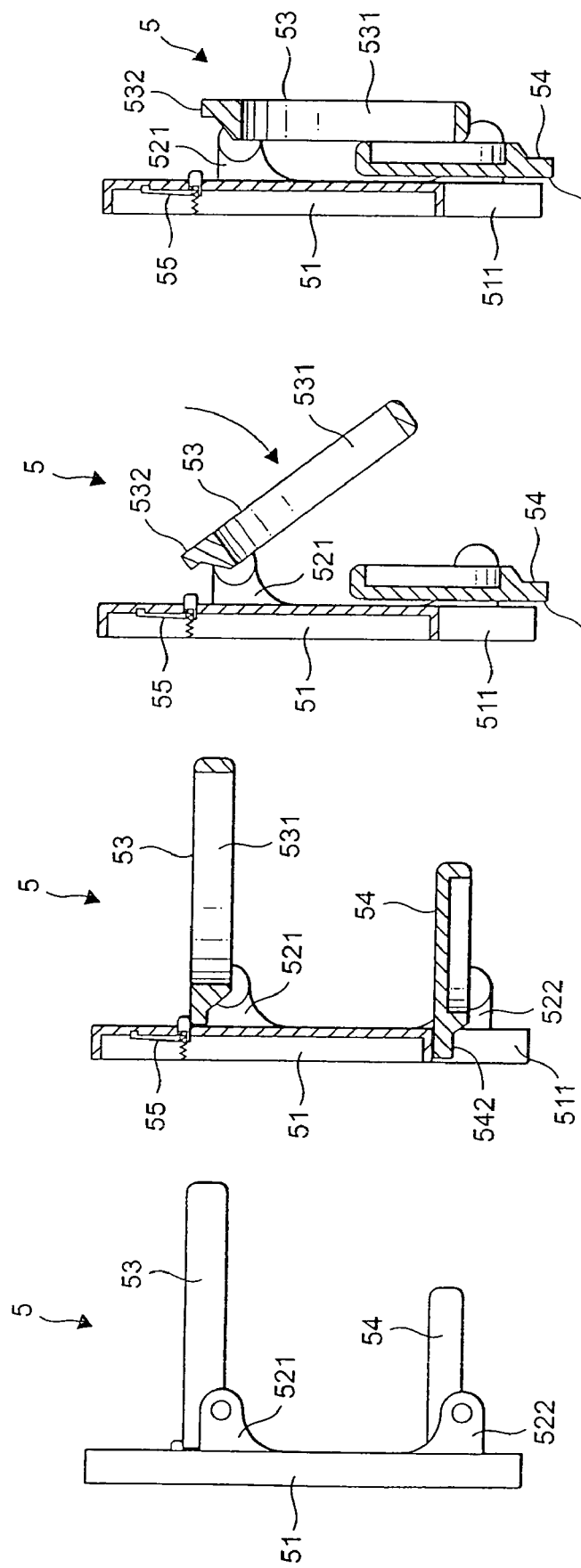

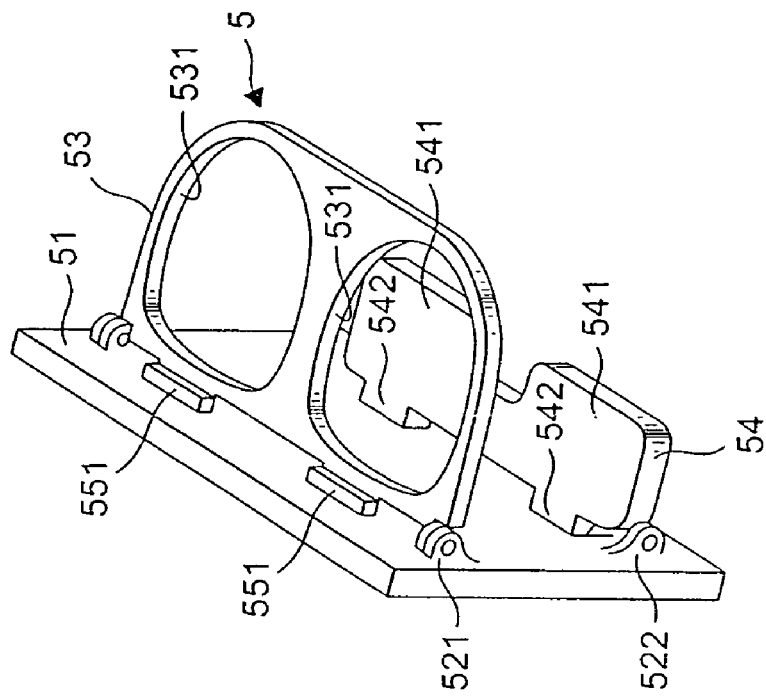
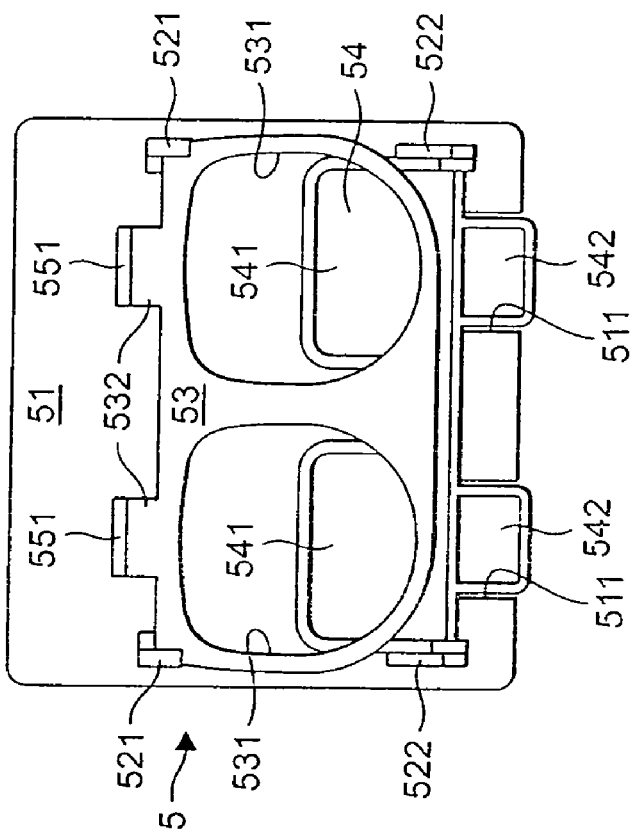
FIG. 8
FIG. 7

DRINK-ITEM HOLDING APPARATUS AND A PORTABLE COOLER BOX INCORPORATING THE SAME

BACKGROUND OF THE INVENTION

The invention relates to a drink-item holding apparatus which may, in use, be used to hold a drink-item such as a can of beer. The invention also relates to a portable cooler box which includes the drink-item holding apparatus and which may be used to cool a drink-item before it is removed to be drunk and temporarily stored in the deployed drink-item holding apparatus.

John Manufacturing Limited already produces a portable cooler box which is shown in UK Registered Design No. 3,004,540 and which is also shown in FIGS. 1 and 2 of the present application.

As shown in FIGS. 1 and 2, the portable cooler box 1 comprises a box body 2 with a lid 3 which is hinged to the box body 2 and may be opened and closed to provide access to a cavity 21 in the box body 2. The box body 2 and the lid 3 generally comprise plastic shells containing thermally insulating material. The box body 2 incorporates a refrigeration unit which is used to cool the cavity 21 and which may, for example, be powered via a lead plugged into the cigarette lighter in the dashboard of a car. The box body 2 incorporates air vents 22 at one end for allowing hot air to escape from the refrigeration unit with the hot air usually being blown out of the vents 22 by a cooling fan that forms part of the refrigeration unit.

That end of the box body 22 is also provided with a compartment (not shown in FIGS. 1 and 2) from which the power lead may be extended when it is needed for use. When the vehicle reaches its destination, and it is desired to take the portable cooler box out of the vehicle (for example, for a picnic), the plug at the end of the power lead will be unplugged form the power point in the vehicle. The power lead may be stuffed back into the compartment in the side of the box body 2 and held therein by a door (not shown) which latches shut.

The refrigeration unit may be switched on and off by using a switch 23. The lid is provided with a latch mechanism 31 which may be released by pulling upwards on a tab 311 in order to disengage the latch mechanism from an undercut recess 24 provided in the top surface of the box body 2.

At the end of the box body 2 remote from the refrigeration unit, the air vents 22 and the switch 23, there is provided a shallow vertical slot 25 which occupies substantially all of the width and height of the end face of the box body.

A drink-item holding apparatus 4 is fitted in the upper part of the vertical slot 25 across the full width of the slot. It comprises a rear wall or back plate 41 from which two side walls 42 project forwards. An upper flap 43 is pivotably mounted between the tops of the side walls 42, and a lower flap 44 is pivotably mounted between the bottoms of the side walls 42. The two flaps 43, 44 are shown stowed in generally vertical positions in FIG. 1, and are shown deployed in generally horizontal positions in FIG. 2. When deployed, a chilled drink-item, such as a can of beer, may be taken out of the refrigerated cavity 21 and placed in the holding apparatus 4 by inserting the drink-item down through one of the circular holes 431 in the upper flap 43, until the base of the drink-item rests on a tab portion 441 of the lower flap 44.

As an alternative to being a beer can, the drink-item could instead be a paper cup that has been filled with a chilled liquid from a bottle stored in the cavity 21. Thus the holding apparatus 4 would function as a cup holder. Two such cups could be placed side by side as is apparent from FIG. 2.

When stowing the lower flap 44 by folding it upwards, an upward force may conveniently be applied to the free edge of the lower flap 44 until it is pivoted round to the generally vertical position shown in FIG. 1. A central edge 442 of the lower flap 44 latches against an undersurface of a projection 411 extending forwards from the planar main face of the rear wall 41. When the other flap 43 is folded upwards, a central edge 432 latches against an undersurface of a central boss 26 of the box body 2 at the top of the slot 25 and at the to of the rear wall 41.

In order to enable the flaps 43, 44 to be latched in the stowed positions shown in FIG. 1, the components of the apparatus 4 are made of plastics material and are resiliently deformable to allow one component to pass over another component to and from a latching position.

SUMMARY OF THE INVENTION

According to an aspect of the invention, there is provided drink-item holding apparatus comprising:

an upper pivot defining an upper pivot axis;

an upper flap pivotably supported by the upper pivot for pivoting about the upper pivot axis from a deployed position which is generally horizontal to a stowed, downwardly-folded position which is generally vertical;

a lower pivot defining a lower pivot axis; and a lower flap pivotably supported by the lower pivot for pivoting about the lower pivot axis from a deployed position which is generally horizontal to a stowed position which is generally vertical;

wherein, when the upper and lower flaps are in their deployed positions, the flaps are arranged to provide at least one drink-item holder structure comprising an aperture in the upper flap for receiving an upper portion of a drink-item and a base support provided by the lower flap for supporting a base portion of the drink-item; and wherein the upper flap is held in its deployed position by a latch mechanism which may be released by applying a downward force to the upper flap to fold the upper flap downwards to its stowed position.

The latch mechanism functions to hold the upper flap in its deployed position, and is resistant to a light knock that might, in use, inadvertently return the upper flap to its stowed position. This unwanted pivoting would be likely to cause spillage of the drink-item. The latch mechanism can be designed to require a downward force of greater than a particular magnitude before unlatching of the upper flap occurs. The threshold magnitude for the downward force may be set to be greater than the light force of a casual, accidental knock.

If the lower flap folds upwards, with the upper flap folding downwards, the preferred arrangement is for the folded flaps to overlap one another. This enables a reduction in the overall height of the drink-item holding apparatus in terms of the height between the lowermost and uppermost part of the folded flaps.

In a preferred embodiment, the apparatus further comprises a wall structure on which the upper and lower pivots are mounted;

the latch mechanism comprises a projection on the upper flap and detent means mounted on the wall structure;

when the upper flap is moved from its stowed position to its deployed position, the projection resiliently passes the detent means to latch the upper flap in the deployed position; and when said downward force is applied to the upper flap, the projection resiliently passes the detent means to unlatch the upper flap.

By having the wall structure as part of the drink-item holding apparatus, the apparatus is a module which can simply be fitted to a bigger item (such as the box body of a portable cooler box) by securing the wall structure to the bigger item. It is not necessary to individually secure the upper and lower pivots to the bigger item.

Also, the latch mechanism can be provided within the drink-item holding apparatus itself, by providing part of the latch mechanism on the upper flap and the rest of the latch mechanism on the wall structure. It is not necessary to fix part of the latch mechanism on the bigger item (e.g. the box body of the portable cooler box) to which the drink-holding apparatus is to be attached.

Preferably, the components of the drink-item holding apparatus are made out of plastics material, because such material will resiliently distort to accommodate or assist in accommodating the passing of the projection to and fro relative to the detent means.

In our preferred embodiment, the detent means comprises an arm having a first end mounted on the wall structure and a second end positioned to be resiliently moved from a home position by the projection as the upper flap moves from its stowed position to its deployed position and as the upper flap moves from its deployed position to its stowed position. It is also preferred that the detent means includes a spring arranged to bias the arm to its home position.

Preferably, the arm comprises a generally L-shaped member with the longer length comprising the first end of the arm and the shorter length comprising the second end of the arm which is generally transverse to the first end.

Preferably, the first end of the arm is located behind the wall structure; and the second end of the arm projects into a hole in the wall structure which is open at the front of the wall structure.

This presents a visually uncluttered appearance, because most of the arm can be arranged, in use, to be hidden when the wall structure is fixed to, for example, the end wall of the box body of a portable cooler box. All that remains visible to the user is the second end of the arm in its hole.

In our preferred configuration, when the upper flap is moved from its stowed position to its deployed position, the projection resiliently passes the second end of the arm by resiliently pushing the second end of the arm into the hole of the wall structure; and when said downward force is applied to the upper flap, the projection resiliently passes the second end of the arm by resiliently pushing the second end of the arm upwards in the hole of the wall structure.

It is therefore possible to make the forces different which are required to latch and unlatch the upper flap. For example, a smaller force could be required for latching, and a bigger force required for unlatching to release the upper flap. This is because the resilient distortion needed for unlatching involves the arm being pushed generally along its length and the arm is likely to bow out sideways at approximately the middle of its length. For latching, it is comparatively easy for the projection to bend the arm sideways in one direction along the length of the arm by pushing the second end of the arm into the hole.

In our preferred embodiment, the arrangement is such that, when said downward force is applied to the upper flap and the projection is resiliently passing the second end of the arm, the second end of the arm is pushed upwards by the projection until the second end abuts against an upper surface of the hole of the wall structure. It is therefore possible to limit the amount of upward movement of the second end of the arm to prevent the arm from being damaged or broken.

In the preferred embodiment, the lower flap is arranged to fold upwards from its deployed position to its stowed position. This makes it possible to design a configuration in which the folded flaps overlap. Preferably, the upper flap can be folded down against the folded lower flap, so that there is actual contact between the flaps when folded.

The upper flap will usually be bigger than the lower flap, in the sense of the upper flap extending to a greater radial extent from its pivot axis than the lower flap does from its pivot axis.

When the height between the pivot axes is set to be less than the projecting radial dimension of the upper flap from its pivot axis, it is the case that, with the lower flap in its deployed position, the upper flap cannot be fully folded down to its stowed position because the upper flap is blocked by the lower flap. This helps to ensure the correct sequence of folding, in that the lower flap has to be folded away first, before the upper flap is folded away.

Preferably, the lower flap has second detent means for latching the lower flap in its stowed position. In this way, the lower flap is less likely to accidentally unfold away from its stowed position. In a preferred embodiment, the second detent means comprises a tab on the lower flap which is resiliently receivable in a recess in the wall structure.

Preferably, the upper flap has third detent means for latching the upper flap in its stowed position against the stowed lower flap. This assists in keeping the upper flap stowed away in its folded-down position. For example, the third detent means comprises a tab on the upper flap which is resiliently receivable in a recess in the structure.

In our preferred embodiment, there are two such drink-item holder structures side by side and using a common upper flap and a common lower flap.

According to another aspect of the present invention, there is provided a portable cooler box comprising a box body having a cavity for storing at a cool temperature a plurality of generally cylindrical drink-items, and a drink-holding apparatus which is in accordance with the first aspect of the present invention and which is fixed to the box body.

As an alternative to forming part of the portable cooler box, the drink-holding apparatus could be fixed to some other item, for example to the dashboard of a car.

BRIEF DESCRIPTION OF THE DRAWINGS

FIG. 3 is a side view of a drink-item holding apparatus in accordance with the present invention, showing the upper and lower flaps deployed or unfolded.

FIG. 4 is a sectional view corresponding to FIG. 3.

FIG. 5 is a sectional view showing the lower flap when folded away to its stowed position, and the upper flap when partially folded away to its stowed position.

FIG. 6 is a further sectional view, showing the upper and lower flaps when fully folded to their stowed positions and when latched to one another.

FIG. 7 is front view of the drink-item holding apparatus when the two flaps are stowed.

FIG. 8 is a perspective view of the drink-item holding apparatus when the two flaps are deployed.

DESCRIPTION OF THE PREFERRED EMBODIMENT

Figure 1:
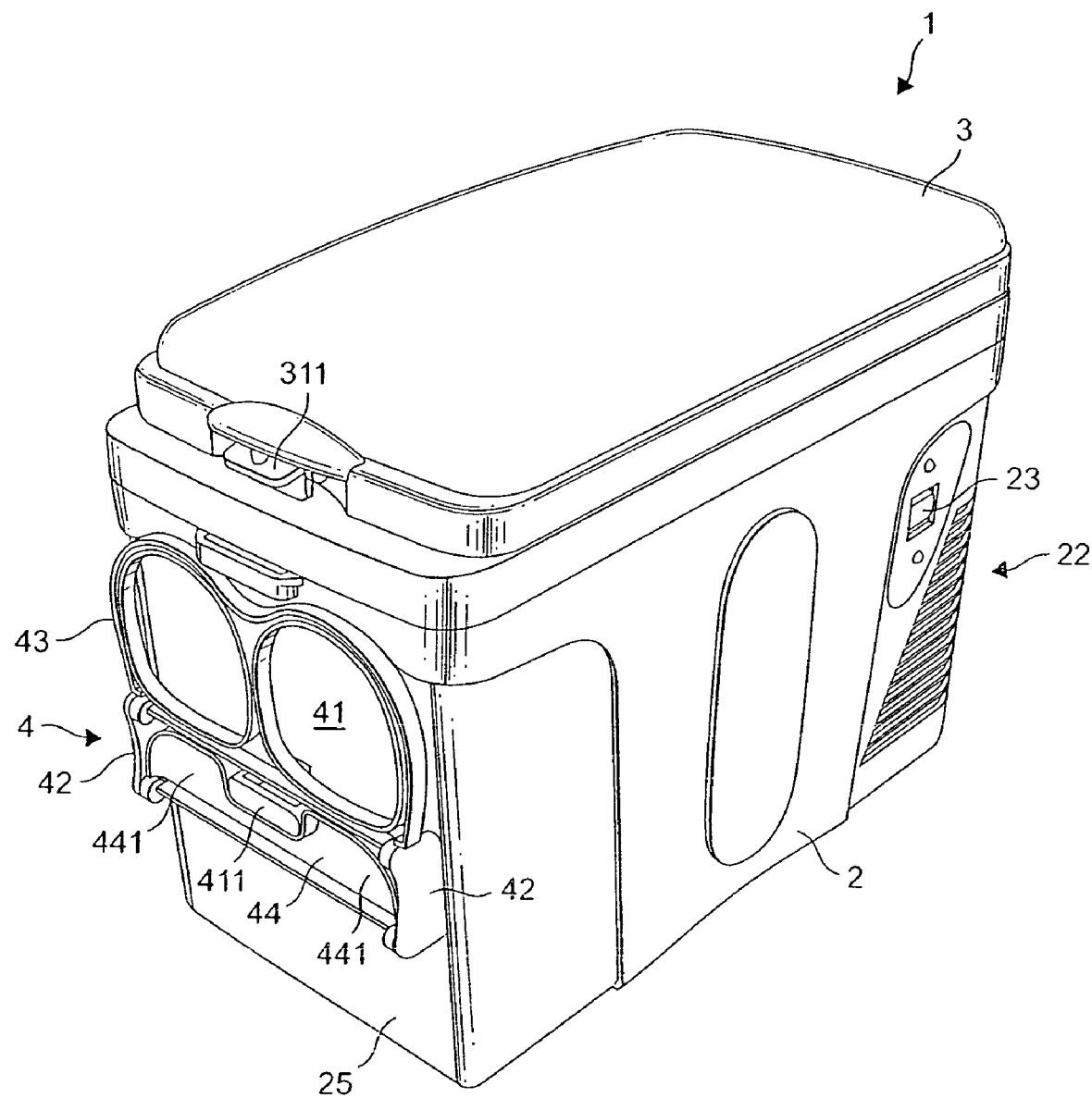
FIG. 1 is a perspective view of an existing portable cooler box produced by John Manufacturing Limited, shown with the lid closed.
Figure 2:
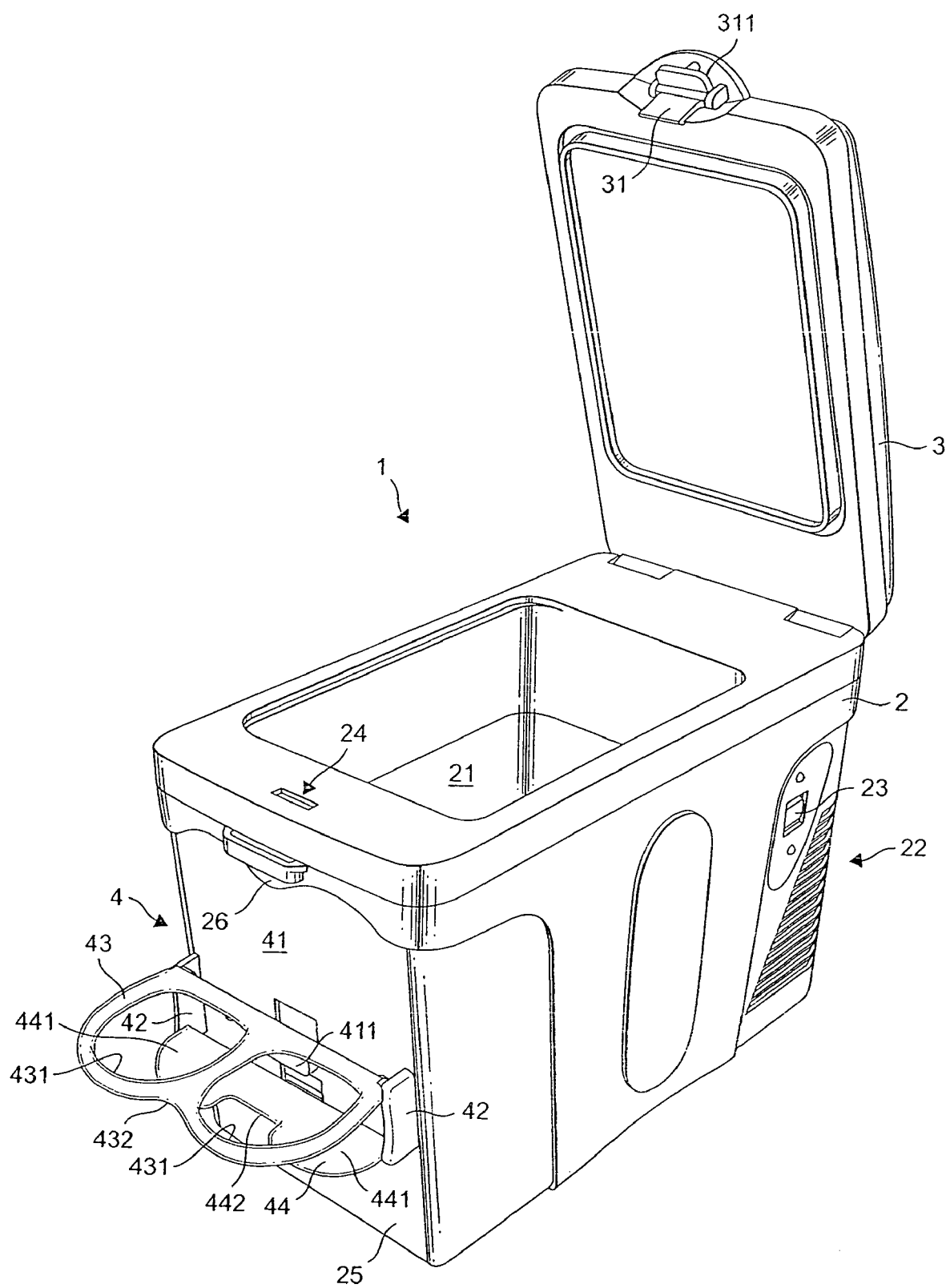
FIG. 2 is a further perspective view of the portable cooler box of FIG. 1, but showing the lid when opened, and also showing the unfolded flaps of the drink-item holding apparatus.

The preferred embodiment of a drink-item holding apparatus in accordance with the present invention is shown in FIGS. 3-9. This drink-item holding apparatus 5 may be used to replace the known drink-item holding apparatus 4 shown in FIGS. 1 and 2 by being fixed to the same vertical slot 25 at one end of the box body 2 of the portable cooler box 1 of FIGS. 1 and 2. The following description concentrates on the features of the drink-item holding apparatus 5.

The apparatus 5 comprises a rear wall 51 which is generally rectangular in front elevation. A pair of upper side walls 521 are spaced apart at the top of the rear wall 51 and they define an upper pivot axis therebetween. This axis pivotably supports an upper flap 53.

At the bottom half of the rear wall 51, a pair of lower side walls 522 project forwards and define therebetween a lower pivot axis. This axis pivotably supports a lower flap 54.

The upper and lower pivot axes are generally horizontal. Each of the flaps 53, 54 can be pivoted from a generally horizontal deployed position (shown in FIG. 8) to a generally vertical stowed position (shown in FIG. 7). The upper flap 53 folds away in the downward direction, and the lower flap 54 folds away in the upward direction. When stowed, the two flaps 53, 54 overlap one another as may be seen from FIG. 7, and the lower flap 54 is positioned between the rear wall 51 and the folded-away upper flap 53.

The apparatus 5 provides two drink-item holder structures which are side by side. Each structure comprises a circular hole 531 in the upper flap 53, and a tab portion 541 of the lower flap. When the lower flap 54 is deployed, the tab portions 541 point forwards away from the rear wall 51 and are located below the circular holes 531 so as to act as base supports for drink items inserted down through the circular holes 531.

As may be seen from FIG. 8, the lower flap also has two rear projections 542 which are received in respective slots 511 of the rear wall 51 and serve to limit the pivoting of the lower flap 54 so that it does not overshoot the generally horizontal position of FIG. 8. This is achieved by each projection 542 which projects rearwardly of the lower pivot axis abutting against a top edge of the respective slot 511, as may be seen in FIG. 4.

When the lower flap 54 is folded away, to its generally vertical stowed position, the apparatus 5 may include detent means (not shown) for latching the lower flap in its stowed position. This detent means may be analogous to the releasably interlockable arrangement of the central edge 442 and projection 411 of the known apparatus 4 of FIGS. 1 and 2.

Such a latching means of the lower flap 54 serves to releasably and resiliently hold the lower flap when it is folded away. When the lower flap 54 is folded out, it is not latched in its deployed configuration of FIG. 8, but some releasable latching means could be provided. For example, detent means could be provided between side edges of the rear projections 52 and side edges of the slots 511.

In relation to the upper flap 53, when stowed away against the underside of the lower flap 54, it may be releasably and resiliently held in that position by detent means (not shown) which latch the upper flap against the undersurface of the lower flap. For example, the undersurface of the upper flap 53 could be provided at its sides with small tabs which are arranged to engage with undercut recesses on the inside surface of the side walls at each side of the lower flap 54.

The apparatus 5 includes two latching mechanisms for holding the upper flap 53 in its unfolded or deployed position in which the flap is generally horizontal. Each latch mechanism comprises a projection 532 at the rear of a respective circular hole 531 adjacent to the upper pivot axis. Specifically, each projection 532 is above the pivot axis, at least during the final stages of the deployment of the upper flap. In this way, the projection 532 approaches the rear wall 51 along a rotational arc which is directed rearwardly and downwardly.

During the last stages of the rotational movement, the projection 532 encounters the free end 551 of an arm 55. The arm 55 is generally L-shaped with the free end or length 551 being transverse to a restrained end or length 552. Specifically, the two lengths are at substantially a right angle to one another.

The length 552 is positioned behind the rear wall 51 and is secured to the rear wall by a ridge 5521 which is at the top of component 552 and which is secured in a complementary slot in the rear face of the rear wall 51. Apart from this fixing position, the length 552 of the arm 55 is free to flex away from the rear face of the rear wall 51.

Figure 9:
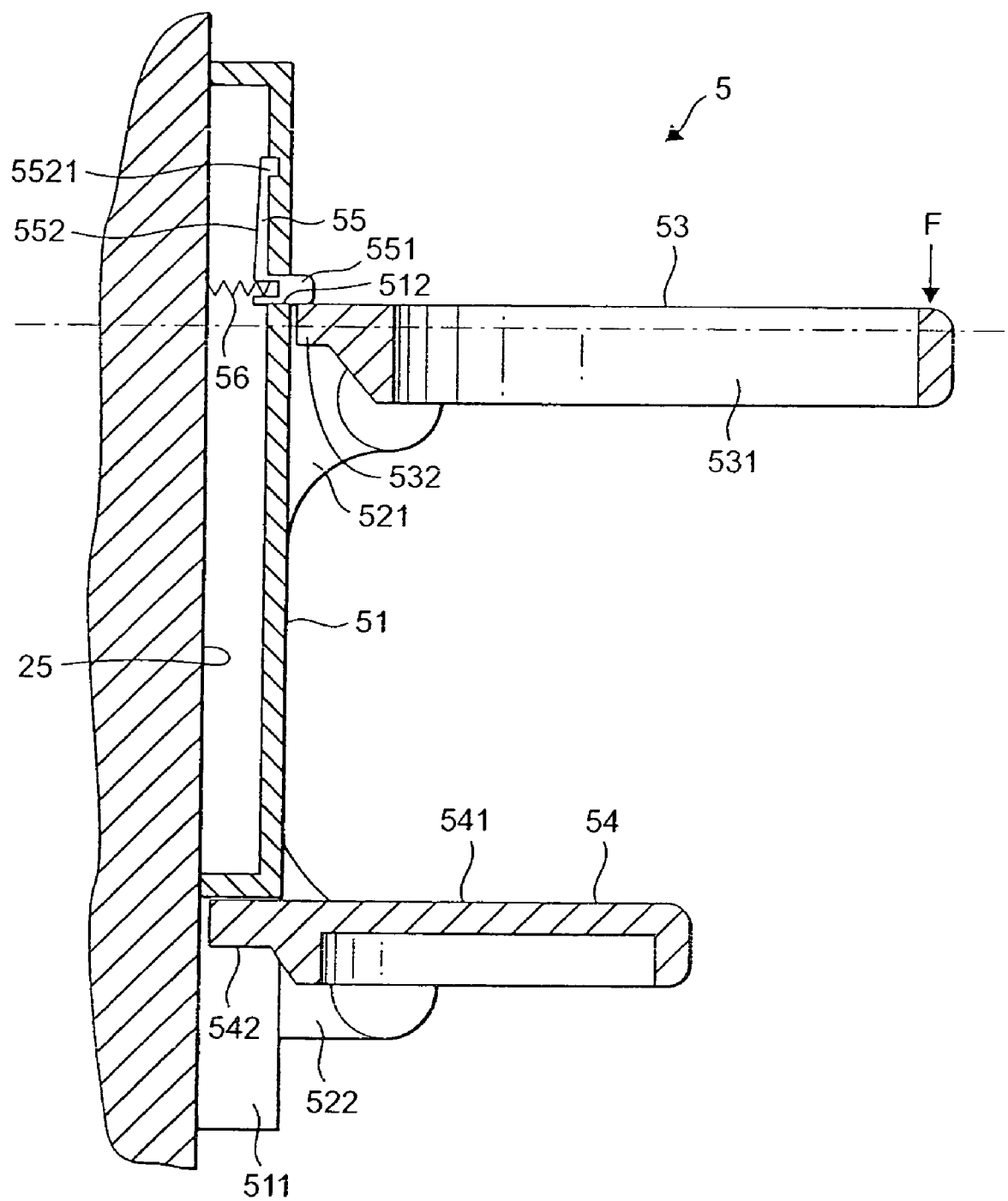
FIG. 9 is an enlarged version of FIG. 4 showing the drink-item holding apparatus when fitted to a wall such as an end wall of a box body of a portable cooler box.

FIG. 9 shows the apparatus 5 when mounted on a wall such as that of the vertical slot 25 of the box body 2 of a portable cooler box. A spring 56 is provided between that wall and the arm 55, in order to bias the arm 55 to its home position as shown in FIG. 9. The spring 56 is received within a recess at the junction between the lengths 551 and 552. Together, the arm 55 and the spring 56 function as resilient detent means which cooperate with a respective projection 532 to form a latch mechanism for releasably holding the upper flap 53 in its deployed position.

As the upper flap 53 rotates round from its stowed position to its deployed position, each projection 532 resiliently passes the free end 551 of the respective arm 55 by pushing the free end into a hole 512 formed through the rear wall 51. The arm 55 is pushed in against the biasing action of the spring 56 and the length 552 lifts away from thee rear face of the rear wall 51 except when the ridge 5521 is locked to the rear wall 51. Thus the projection 532 resiliently passes the arm 55 until the arm 55 is free to snap back into its home position, thereby to latch the upper flap 53 in its unfolded or deployed configuration.

The deployment process may be reversed by applying a downward force F shown in FIG. 9 to the forward edge of the upper flap 53. This causes the upper flap to rotate clockwise as viewed in FIG. 9. The projection 532 rotates upwards and forwards. It resiliently passes the arm 55. Although FIG. 9 shows the free end 551 of the arm 55 as being a tight fit in the hole 512, in fact in the home position of the arm there is a slight gap between the top surface of the free end 551 and the top surface of the hole 512. This enables the free end 551 of the arm 55 to be resiliently pushed upwards through bowing of the restrained end 552, until the end 551 has risen high enough to engage against the top surface of the hole 512. This prevents further movement of the arm 55, but sufficient resilient deformation of the arm has already occurred for the projection 532 to be able to pass over the forward tip of the arm. Thus the upper flap 53 is unlatched from its deployed position and is free to continue to rotate further clockwise to its stowed position. After the projection 532 has rotated clear of the arm 55, the arm is free to return to its home position biased by the spring 56.

The two identical latch mechanisms provided by the projections 532, arms 55 and springs 56 releasably fasten the upper flap 53 during the final stage of its rotational deployment from being vertical to being horizontal, and the two latch mechanisms serve to prevent any inadvertent, premature folding away of the upper flap. A user is required to apply the downward force F which may be designed to be a comfortable value, i.e. not too small and not too big.

After the latch mechanisms have been activated upon deployment of the upper flap 53, the upper flap can rotate slightly further (anticlockwise as viewed in FIG. 9) until the projections 532 encounter the front face of the rear wall 51. That front face acts as a stop to limit or prevent pivoting significantly past the deployed horizontal position of the upper flap 53.

The apparatus 5 is made from plastics material (except for the metal springs 56) which is able to resiliently distort to some extent to accommodate the latching actions and unlatching actions of the two flaps 53, 54.

The apparatus 5 may be loosely described as a foldable cup-holder mechanism, even though it may be used to hold beer cans and the like in addition to paper cups containing a drink.

Each of the holes 531 is a complete annulus as that is the most effective way for the aperture laterally to restrain the upper portion of a drink-item, and it also ensures that the upper flap 53 is structurally strong.

The invention claimed is:

1. Drink-item holding apparatus comprising:
    an upper pivot mounted on a wall structure and defining an upper pivot axis;
    an upper flap pivotably supported by the upper pivot for pivoting about the upper pivot axis from a deployed position which is generally horizontal to a stowed, downwardly-folded position which is generally vertical;
    a lower pivot mounted on the wall structure and defining a lower pivot axis; and
    a lower flap pivotably supported by the lower pivot for pivoting about the lower pivot axis from a deployed position which is generally horizontal to a stowed position which is generally vertical;
    wherein:
    when the upper and lower flaps are in their deployed positions, the flaps are arranged to provide at least one drink-item holder structure comprising an aperture in the upper flap for receiving an upper portion of a drink-item and a base support provided by the lower flap for supporting a base portion of the drink-item;
    wherein the upper flap is held in its deployed position by a latch mechanism which may be released by applying a downward force to the upper flap to fold the upper flap downwards to its stowed position;
    the latch mechanism comprises a projection on the upper flap and detent means mounted on the wall structure;
    when the upper flap is moved from its stowed position to its deployed position, the projection resiliently passes the detent means to latch the upper flap in the deployed position;
    when said downward force is applied to the upper flap, the projection resiliently passes the detent means to unlatch the upper flap;
    wherein the detent means comprises an arm having a first end mounted on the wall structure and a second end positioned to be resiliently moved from a home position by the projection as the upper flap moves from its stowed position to its deployed position and as the upper flap moves from its deployed position to its stowed position;
    the first end of the arm is located behind the wall structure; and
    the second end of the arm projects into a hole in the wall structure which is open at the front of the wall structure.

2. Apparatus according to claim 1, wherein the detent means includes a spring arranged to bias the arm to its home position.

3. Apparatus according to claim 1, wherein the arrangement is such that:
    when the upper flap is moved from its stowed position to its deployed position, the projection resiliently passes the second end of the arm by resiliently pushing the second end of the arm into the hole of the wall structure; and
    when said downward force is applied to the upper flap, the projection resiliently passes the second end of the arm by resiliently pushing the second end of the arm upwards in the hole of the wall structure.

4. Apparatus according to claim 3, wherein the arrangement is such that, when said downward force is applied to the upper flap and the projection is resiliently passing the second end of the arm, the second end of the arm is pushed upwards by the projection until the second end abuts against an upper surface of the hole of the wall structure.

5. Apparatus according to claim 1, wherein the lower flap is arranged to fold upwards from its deployed position to its stowed position.

6. Apparatus according to claim 5, wherein the upper flap can be folded down against the folded lower flap.

7. Apparatus according to claim 5, wherein the arrangement is such that, with the lower flap in its deployed position, the upper flap cannot be fully folded down to its stowed position because the upper flap is blocked by the lower flap.

8. Apparatus according to claim 1, wherein there are two such drink-item holder structures side by side and using a common upper flap and a common lower flap.

9. A portable cooler box comprising:
    a box body having a cavity for storing at a cool temperature a plurality of generally cylindrical drink-items; and
    drink-item holding apparatus according to claim 1 fixed to the box body.

* * * * *